United States Patent [19]

Chivari

[11] Patent Number: 4,897,073
[45] Date of Patent: Jan. 30, 1990

[54] SHAFT COUPLING FOR ROTATING ELEMENTS

[76] Inventor: Ilie Chivari, Vellwigstrasse 51, D-4690 Herne 1, Fed. Rep. of Germany

[21] Appl. No.: 231,112

[22] Filed: Aug. 11, 1988

[30] Foreign Application Priority Data

Aug. 31, 1987 [DE] Fed. Rep. of Germany ....... 3728970

[51] Int. Cl.⁴ .................................................. F16D 3/16
[52] U.S. Cl. .................................. 464/70; 416/134 A; 464/71; 464/85; 464/138; 464/147
[58] Field of Search ............... 416/102, 134 R, 134 A, 416/148; 464/70, 71, 85, 106, 112, 136, 137, 138, 147

[56] References Cited

U.S. PATENT DOCUMENTS

| | | | |
|---|---|---|---|
| 2,831,673 | 4/1958 | Paulsen | 464/71 X |
| 2,837,901 | 6/1958 | Chapman | 464/71 X |
| 2,959,437 | 11/1960 | Piragino | 464/71 |
| 3,067,596 | 12/1962 | Caunt | 464/71 |
| 3,112,626 | 12/1963 | Barone | 464/71 |
| 3,823,576 | 7/1974 | Colletti et al. | 464/71 |
| 4,004,669 | 1/1977 | Roderick | 464/71 X |
| 4,040,270 | 8/1977 | Chivari | 464/71 X |
| 4,115,031 | 9/1978 | Drees et al. | 416/134 A |
| 4,182,139 | 1/1980 | Hornig et al. | 464/71 X |
| 4,188,802 | 2/1980 | Zeidler et al. | 464/71 |
| 4,496,331 | 1/1985 | Atkin | 464/70 |
| 4,588,388 | 5/1986 | Chivari | 464/71 X |
| 4,729,753 | 3/1988 | Neathery et al. | 464/71 |
| 4,734,081 | 3/1988 | Neathery et al. | 464/71 |

Primary Examiner—Daniel P. Stodola

[57] ABSTRACT

A shaft coupling is disclosed which permits an angle between two coupled rotating elements. A coupling half is adapted to be connected to each of the elements. Intermediate coupling members are arranged between the coupling halves. These intermediate coupling members are connected through resilient joints to a first coupling half and, also to the second coupling half. Each of the intermediate coupling members directly connected to the first coupling half through a first pair of diametrically opposite resilient joints are also connected in an angularly offset manner to the second coupling half through a second pair of diametrically opposite resilient joints.

9 Claims, 4 Drawing Sheets

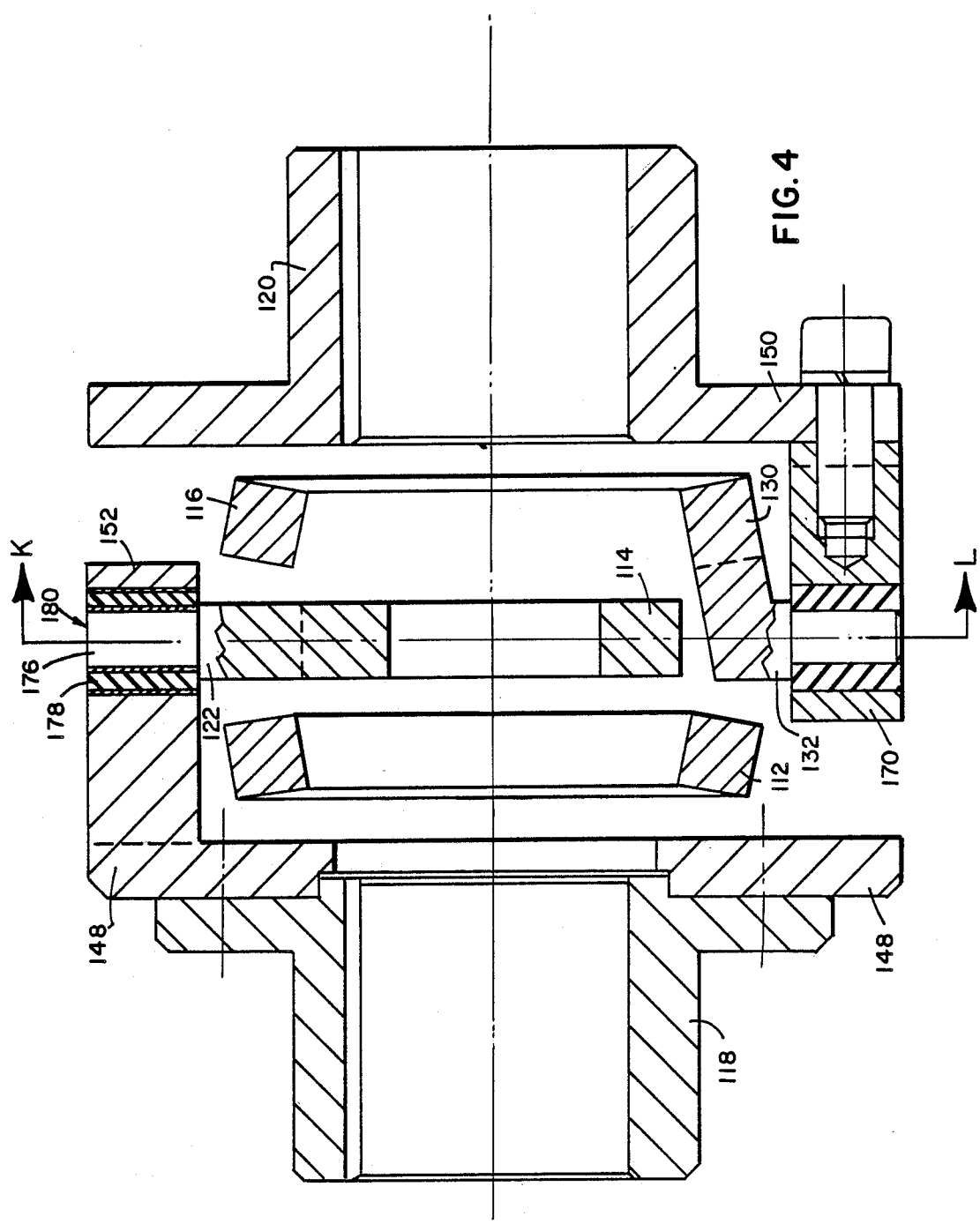

SHAFT COUPLING FOR ROTATING ELEMENTS

TECHNICAL FIELD

The invention relates to a shaft coupling, which permits an angle between two coupled rotating elements comprising (a) a first coupling half, which is adapted to be connected to a first rotating element.

(b) a second coupling half, which is adapted to be connected to a second rotating element, (c) intermediate coupling members, which are connected through resilient joints, on one hand to the first coupling half and, on the other hand, to the second coupling half.

BACKGROUND ART

Such a coupling is known, for example, through U.S. Pat. No. 4,040,270. In this known coupling three concentric rings rotatably mounted on each other are provided as intermediate members. Each of the rings is connected to a first coupling half through a link and to a second coupling half through another link. Therein, the links are pivoted through resilient joints on the rings and on the coupling halves. This coupling is homokinetic with regard to its kinematic linkage, this means that the driven coupling half angle-truely follows the driving coupling half, and this independently of any radial displacement of the axes of rotation or of any angular displacement. Therein, the resilient joints only have the function to permit a pivotal movement of the links without sliding movement or rotational movement in roller bearings. The resilient joints do not have to take up any irregularities of the driven movement. Such irregularities with radial or angular displacement are kinematically exactly compensated by the pivotal movements of the links in connection with a rotation of the rings relative to each other.

In this known coupling the three rings, that means the intermediate members, are rotatably mounted on each other. Thus, it is necessary to provide a support for the rings. Furthermore, three links are provided. Thereby, sometimes difficulties to accommodate the coupling in a close space arise.

SUMMARY OF THE INVENTION

It is the object of the invention to provide a coupling of the above defined type, which
has a simple construction.
needs little space,
does not have any bearings, and
ensures a uniform drive of a driven element.

According to the invention this object is achieved in that (d) each of the intermediate coupling members is directly connected to the first coupling half through a first pair of diametrically opposite resilient joints and directly connected to the second coupling half through a second pair of diametrically opposite resilient joints angularly offset by 90° relative to the first pair, and (e) the intermediate coupling members are arranged angularly offset, such that the acceleration and deceleration forces arising through the accommodation of the kinematic irregularity of the driven movement for each intermediate member in the resilient joints substantially balance each other.

The shaft coupling according to the invention is not homokinetic with regard to the kinematic linkage. When the axes of rotation are angularly displaced and the drive is uniform, a slightly irregular driven movement is transmitted through each intermediate coupling member. The driven rotation element tends to rotate with uniform speed due to its inertia. The irregularity of the driven movement of the intermediate coupling member is accommodated by the resiliency of the resilient joints. Therein however, acceleration and deceleration forces act on the driven rotating element. Thus, using a single intermediate coupling member, an irregular driven movement would result as with an universal joint. According to the invention, however, several intermediate coupling members are arranged such, that the acceleration and deceleration forces arising through the irregularities just substantially balance each other. Thereby, a uniform driven speed is achieved, even if the movement transmission through each individual coupling intermediate member is not kinemetically homokinetic. In a way, the shaft coupling is not kinematic but dynamically homokinetic.

An advantage of the shaft coupling according to the invention is that there is no need of mounting, for example, the intermediate coupling members on each other. Furthermore, no links are present. Therefore, the shaft coupling is very compact. It is also very simply constructed with few elements.

Two embodiments of the inventions will now be described in greater detail with reference to the accompanying drawings.

BRIEF DESCRIPTION OF THE DRAWINGS

FIG. 4 shows a longitudinal section of another embodiment of a shaft coupling taken along the line I-J of FIG. 5.

DETAILED DESCRIPTION AND SPECIFICATION OF THE INVENTION

Figure 1:
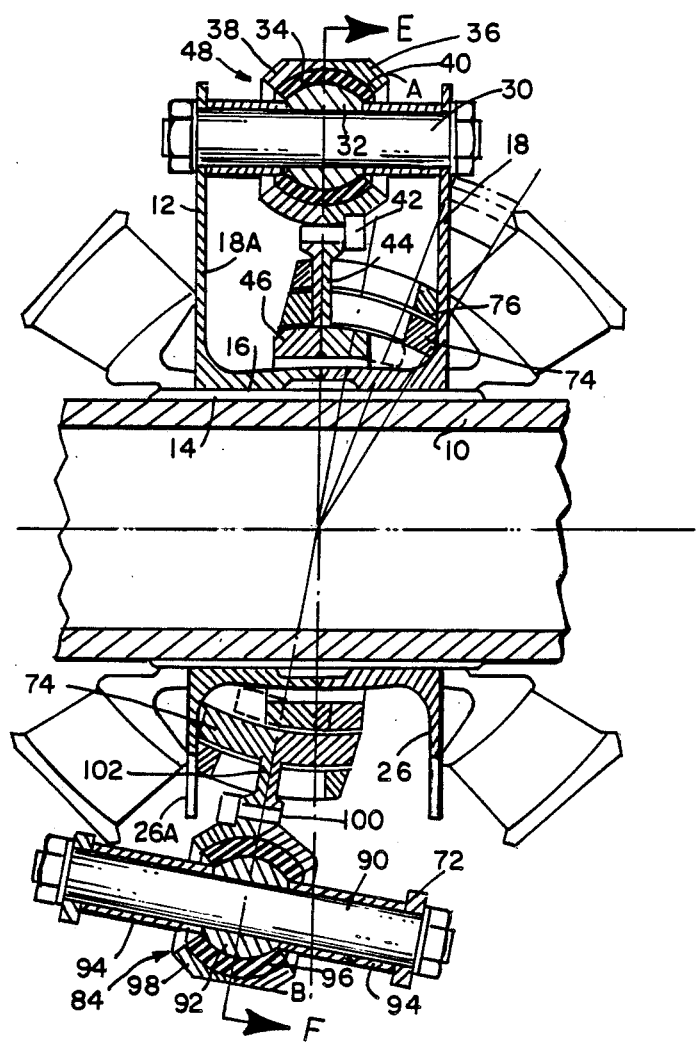
FIG. 1 shows a longitudinal section through a shaft coupling according to the invention taken along the line C-D of FIG. 2.
Figure 2:
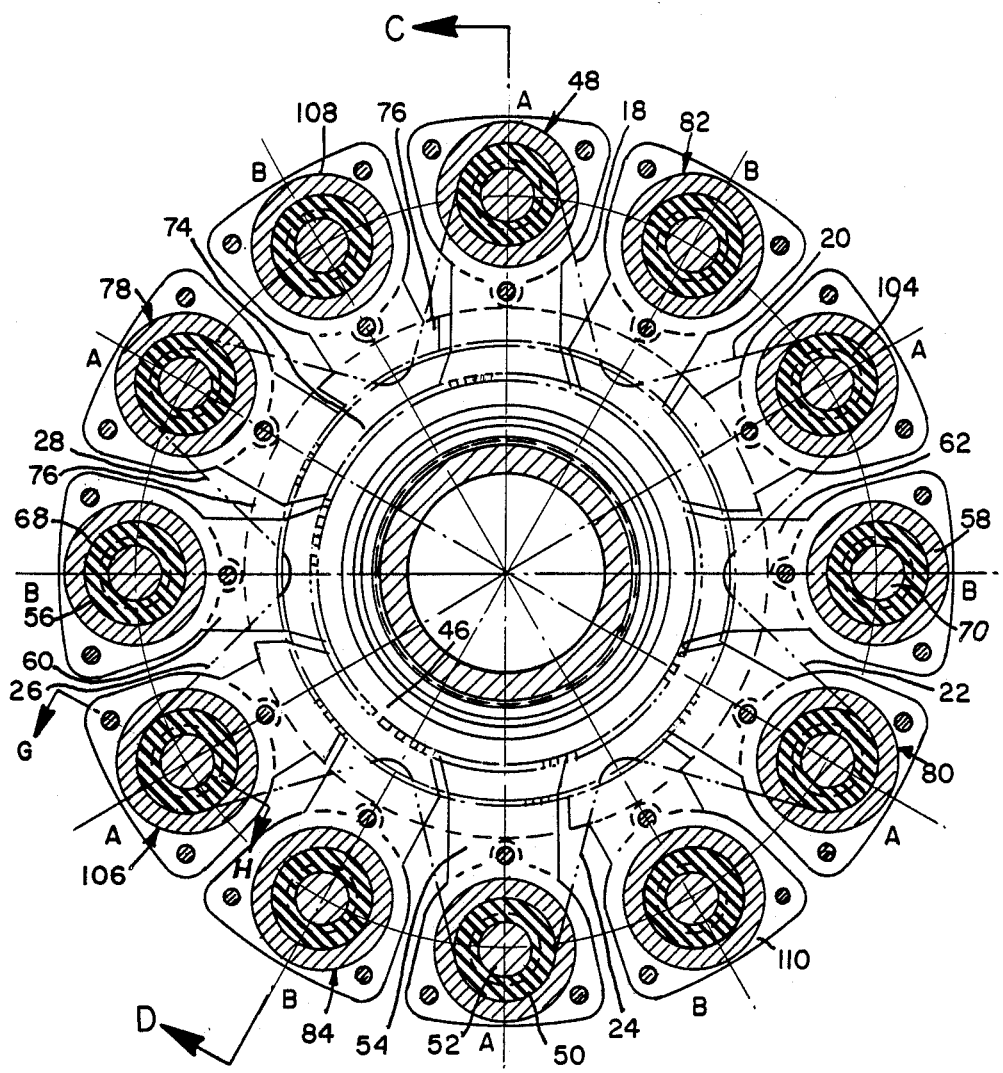
FIG. 2 shows a section taken along the line E-F of FIG. 1.
Figure 3:
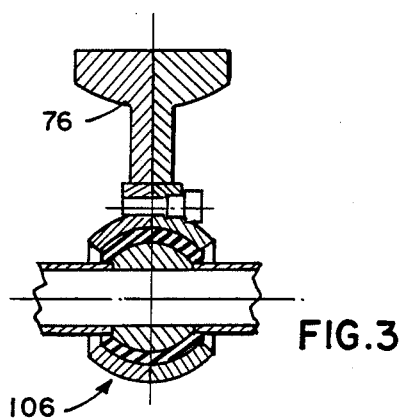
FIG. 3 shows a section taken along the line G-H of FIG. 2.

In the embodiment of FIG. 1 to 3 numeral 10 designates a driving shaft All elements of the driving side are designated by "A". A side body 12 is located on the driving shaft 10. The side body 12 forms the driving side coupling half. The side body 12 is non-rotatably connected to the driving shaft 10 by means of splines 14. The side body 12 has a hub 16 and six pairs of radially projecting side pieces 18,18A (FIG. 1), 20, 22, 24, 26 (FIG. 2), 26A (FIG. 1), 28 (FIG. 2). A bearing bolt 30 extends between the side pieces 18 and 18A (FIG. 1). A spherical joint inner portion 32 is located on the bearing bolt. The joint inner portion 32 is surrounded by a resilient layer 34. The resilient layer 34 is, in turn, surrounded by a joint outer portion 36. The joint outer portion 36 consists of two generally triangular halves, as can be seen from FIG. 1, having concave-spherical annular surfaces. The halves 38,40 are assembled about the resilient layer 34 and tightened against each other by screws 42. A radial arm 44 (FIG. 1) is connected to the halves 38, 40, which arm is connected to an inner ring 46 in the upper part of FIG. 1. For assembly reasons, the arm 44 and the ring 46 are also two-parted, each part being integral with one of the halves 38 and 40. The whole is a resilient joint 48, through which the inner ring 46 forming an intermediate coupling member is connected to the driving side coupling half. A corresponding resilient joint 50 is arranged between the side pieces 24 (FIG. 2) on a bolt 52. This joint 50 is located diametrically opposite the joint 48 and also connected to the innermost ring 46 through an arm 54.

At the innermost ring 46 two correspondingly mounted resilient joints 56 and 58 angularly displaced by 90 degrees relative to the joints 48 and 50 are attached to arms 60 and 62, respectively, of these joints 56 and 58, and respectively, are connected through bearing bolts 68 and 70, respectively, to a driven side coupling half 72 (FIG.1).

Thus, a drive is effected from the driving shaft 10 through the intermediate coupling member in the form of the ring 46 to the driven side rotating coupling half 72 All elements of the driven side are designated by "B". Therein, the resilient joints permit an angular displacement between the axes of the driving shaft 10 and the driven side coupling half 72. Therein, however, the movement transmission is not homokinetic. At the driven side, sinusoidal variations of the rotary speed are superimposed to the constant angular rate. Each individual intermediate coupling member exerts periodical acceleration and deceleration forces on the driven side portion, such that the acceleration and deceleration forces become effective at the resilient joints due to the inertia of this portion.

However, as shown in FIG. 1, three intermediate coupling members 46, 74 and 76 are provided in the form of concentric rings. Two diametrically opposite resilient joints 78 and 80 are located at the intermediate coupling member 74, through which joints the intermediate coupling member 74 is connected to the side body 12. Angularly displaced by 90° relative to this pair of joints 78, 80, two resilient joints 82 and 84 are located at the intermediate coupling member 74, through which joints 82 and 84 the intermediate coupling member 74 is connected to the driven side coupling half 72.

The connection is illustrated in section in the lower part of FIG. 1 with the resilient joint 84 being shown. A bolt 90 is located in the driven side coupling half 72. A joint inner portion 92 is mounted on the bolt 90. The joint inner portion 92 is held centrally by distance sleeves 94. The joint inner portion is surrounded by a resilient layer 96. The resilient layer 96 is, in turn, surrounded by a joint outer portion 98, the joint outer portion 98 consists of two halves having spherical annular surfaces, which are assembled about the resilient layer 96. The halves are tightened together by screws 100. The joint outer portion 98 is connected through a radial arm 102 to the intermediate coupling member 74, that is the central ring.

As can be seen from FIG. 1, the driven side coupling half 72 is tilted relative to the driving shaft 10 and to the driving side coupling half, namely the side body 12.

The third intermediate coupling member 76 in the form of the outer ring is connected through resilient joints 104 and 106 to the driven side coupling half, that is the side body 12, and through resilient joints 108, 110 to the driven side coupling half 72. All the resilient joints are angularly displaced from one another by 30°. Each time, a joint, for example 106, connected to the driven side coupling half 72 is arranged between two joints connected to the driving side coupling half, that means the side body 12. The resilient joints, for example 78, connected to the second intermediate coupling member 74, that means the central ring, are angularly displaced by 60° relative to the corresponding joints, for example 48, connected to the first intermediate coupling member 46. The resilient joints, for example 106, connected to the third intermediate coupling member 76, that means the outer ring, are angularly displaced by 120° relative to the corresponding joints, for example 48, connected to the first intermediate coupling member 46. The intermediate coupling members 46, 74 and 76 are not mounted at or on each other, but individually movable with the coupling halves.

Figure 5:
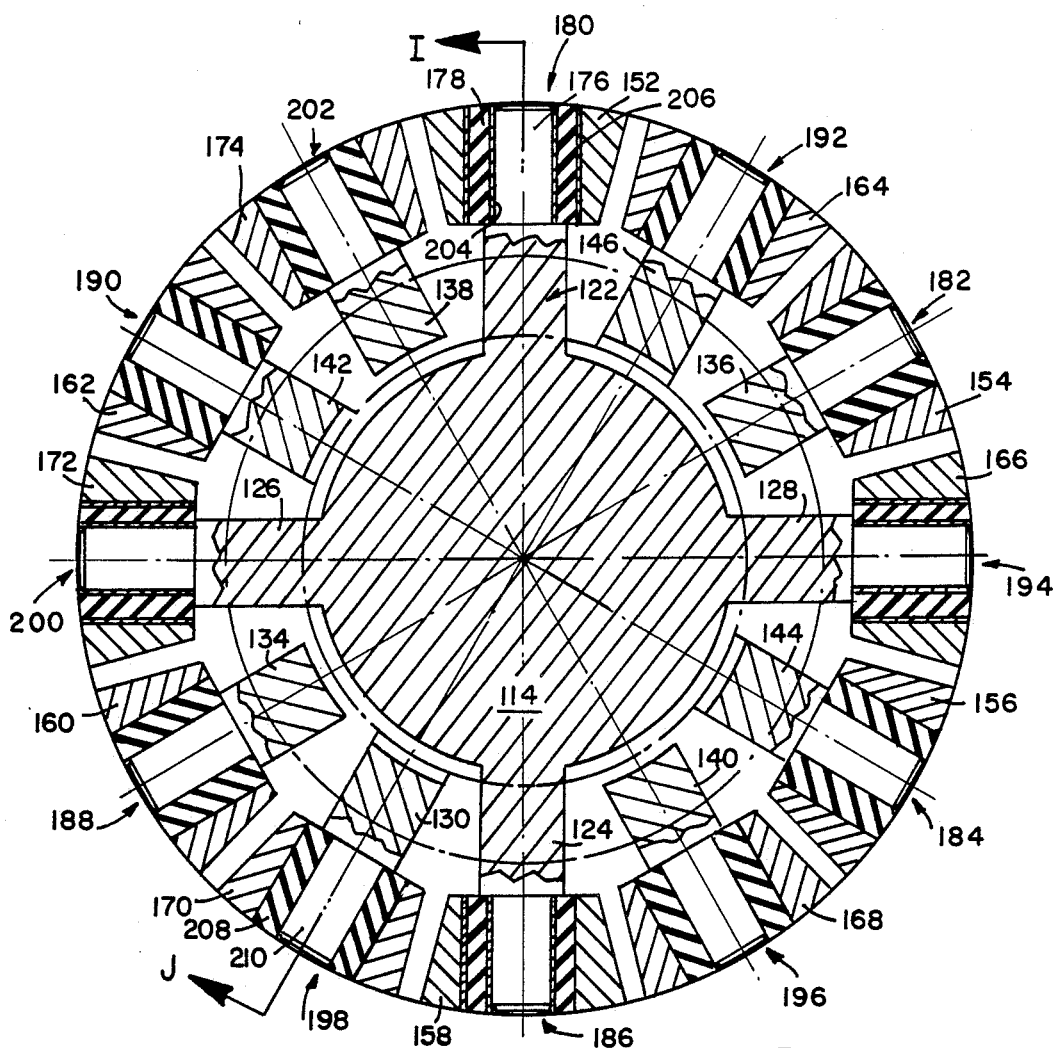
FIG. 5 shows a section taken along the line K-L of FIG. 4.

Each individual intermediate coupling member 46, 74 and 76 transits, when angularly displaced, an irregular driven movement, with which acceleration and deceleration forces occur. Due to the fact, that the intermediate coupling members with the associated joints are angularly displaced in the described manner, each of the three intermediate coupling members 46, 74 and 76 tend to give a different irregular movement to the driven side coupling half 72. The differences of the driven movement is taken up with regard to the distance by the resilient joints. Therewith, however, forces occur, which tend to accelerate the driven side coupling half. However, the angular displacement of the intermediate coupling members and of the joints is such, that the acceleration and deceleration forces arising through the irregularities of the driven movement of the intermediate members is balanced, such that a constant non-varying driven torque acts on the driven side coupling half and on the driven side rotating element. FIGS. 4 and 5 show an embodiment, in which the three intermediate coupling members 112, 114 and 116 are formed by three rings, which are coaxially arranged behind each other as viewed in the axial direction between the two coupling halves 118 and 120. The intermediate coupling members have radial arms, which are connected to the coupling halves 118 or 120 through resilient bearings. The arms 122, 124, 126 and 128 at the central intermediate coupling member 114 extend radially outwardly. The arms, for example 130 FIG. 4), of the two outer intermediate coupling members 112 and 116 are bent inwards, such that the ends 132 (e.g. 132 of the arm 130) extend in radial direction and are located in the plane of the arms 122, 124, 126 and 128.

Diametrically opposite arms 134 and 136 as well as two further diametrically opposite arms 138 and 140 angularly displaced by 90° relative to the arms 134, 136 are provided at the intermediate coupling member 112. The two arms 122 and 124 are arranged diametrically oppositely at the central intermediate coupling member. The arms 126 and 128 are also diametrically opposite and angularly displaced by 90° relative to the arms 122, 124. Two arms 142 and 144 are arranged diametrically opposite at the intermediate coupling member 116. Two further arms 146 and 130 are also arranged diametrically opposite at the intermediate coupling member 116 and angularly displaced by 90° relative to the arms 142 and 144.

As shown in FIG. 4, flanges 148 and 150, respectively, are attached to the coupling halves 118 and 120. Interengaging claws 152, 154, 156, 158, 160, 162 and 164, 166, 168, 170, 172, 174, respectively, are alternately arranged (as shown in FIG. 5). They also extend axially towards each other, as can be seen from FIG. 4, and with respect to claws 152 and 170 are located on the flanges 148 and 150, respectively. Radial pins are located at the arms, for example the pin 176 at the arm 122. These pins are resiliently mounted in each one of the claws 152 to 174 through hollow cylindrical rubber parts, for example rubber part 178 in claws 152. The pins with the rubber parts form resilient joints 180, 182, 184, 186, 188, 190 and 192, 194, 196, 198, 200, 202, respectively, through which the intermediate coupling members 112, 114, 116 are connected to the coupling halves 118 and 120, respectively. As can be seen from FIG. 5, for example the intermediate coupling member 114 is connected to the claws 152 and 158 of the driving side coupling half 118 through the arms 122 and 124 and through the resilient joints 180 and 186, and connected to the claws 172 and 166, respectively, of the driven side coupling half 120 in a plane perpendicular to the plane of the arms 122, 124 through the arms 126 and 128 and through the resilient joints 200 and 194. In a corresponding way, the intermediate coupling members 112 and 116 are connected angularly displaced by 60° and 120°, respectively, in mutually perpendicular planes to the coupling half 118 and to the coupling half 120 through resilient joints 182, 188 and 202, 198, and 184, 190 and 192, 198, respectively.

The function of the shaft coupling illustrated in FIGS. 4 and 5 is the same as the function of the shaft coupling of FIGS. 1 to 3. The shaft coupling of FIGS. 4 and 5 is very simple in construction. The coupling halves 118 and 120 as well as the intermediate coupling members 113 and 116 are identical parts. Also the resilient joints are very simply constructed.

There may be many modifications of a resilient joint. As shown in FIG. 5, for example, the joints 180, 194, 186 and 200 associated with the central intermediate coupling member 114, comprise inner and outer bushings 204 and 206, respectively, to which the rubber body 178 is connected by vulcanization; whereas, in the other joints, the rubber body, for example 208, is directly connected to the pin 210 and to the claw 170, as illustrated with the joint 198. These and other modifications of construction may be made within the spirit and scope of the invention.

What I claim is:

1. A shaft coupling, which permits an angle between two coupled rotating elements, comprising
    a first coupling half which is adapted to be connected to a first rotating element,
    a second coupling half which is adapted to be connected to a second rotating element,
    intermediate coupling members which are connected through resilient universally movable joints to the first coupling half and also to the second coupling half,
in which
    each of the intermediate coupling members are half through a first pair of diametrically opposite resilient joints and are
    directly connected to the second coupling half through a second pair of diametrically opposite resilient joints angularly offset by 90° relative to the first said pair, and
    the intermediate coupling members are arranged angularly offset to one another in such manner that the acceleration and deceleration forces arising as a result of any kinematic irregularity of the driven movement for each intermediate member in the resilient joints is substantially balanced out.

2. A shaft coupling as set forth in claim 1, in which the intermediate coupling members are formed by three concentric rings.

3. A shaft coupling as set forth in claim 2, in which each of the resilient joints has
    an inner joint portion
    a resilient layer surrounding the inner joint portion, and
    an outer joint portion, which extends over the resilient layer with a concave-spherical inner surface,
    the inner joint portion being connected to a coupling half and the outer joint portion being connected to an intermediate coupling member.

4. A shaft coupling as set forth in claim 3, in which
    the inner joint portion has a diametrical bore, through which a fastening means is arranged, and
    the outer joint portion is formed by two halves, which have an aperture through which the fastening means extends and which is surrounded by a concave-spherical annular surface, these two halves being assembled about the resilient layer and held tightly against each other and the two annular surfaces forming said concave-spherical inner surface by said fastening means.

5. A shaft coupling as set forth in claim 1, in which in the intermediate coupling members are formed by three rings coaxially arranged behind each other as viewed in the axial direction, comprising inner, central and outer intermediate coupling members.

6. A shaft coupling as set forth in claims 2 or 5, in which corresponding resilient joints of and two of the three intermediate coupling members are arranged mutually angularly offset by either 60° or 120°, respectively.

7. A shaft coupling as set forth in claim 1, in which the resilient joints are located at radial arms of the intermediate coupling members.

8. A shaft coupling as set forth in claim 7, in which
    the radial arms of the central intermediate coupling member extend radially in the plane of this intermediate coupling member, and
    the radial arms of the outer intermediate coupling member, such that the associated resilient joints also are located in said plane.

9. A shaft coupling as set forth in claim 8, characterized in that
    radial pins are provided at the arms of the intermediate coupling members,
    said pins having mounted thereon a hollow cylindrical rubber body wherein,
    coupling halves are respectively connected to driver and driven members, said coupling halves being each provided with interengaging claws extending axially towards each other, and
    said hollow cylindrical rubber bodies are supported within said claws, whereby the pins, rubber bodies and the claws form resilient joints.

* * * * *